United States Patent [19]
Aron

[11] 4,400,727
[45] Aug. 23, 1983

[54] MOVING MAP DISPLAY
[75] Inventor: Mitchell Aron, Harrington Park, N.J.
[73] Assignee: The Bendix Corporation, Teterboro, N.J.
[21] Appl. No.: 325,610
[22] Filed: Nov. 27, 1981
[51] Int. Cl.³ .............................................. H04N 7/18
[52] U.S. Cl. ................................... 358/103; 358/102; 358/181
[58] Field of Search ................. 358/93, 181, 103, 104, 358/87, 102

[56] References Cited

U.S. PATENT DOCUMENTS 3,507,993 4/1970 Mulley .
3,697,681 10/1972 McCoy ................................ 358/104
4,103,435 8/1978 Herndon .
4,360,876 11/1982 Girault et al. .

Primary Examiner—Howard Britton
Attorney, Agent, or Firm—Joseph E. Funk; Stanley N. Protigal; Anthony F. Cuoco

[57] ABSTRACT

A moving map display used on an aircraft or other moving vehicle is disclosed. Discreet map segments are stored on a video signal storage means and portions of the video signals for several map segments are read from the storage means and combined to create a composite map segment which is displayed within the aircraft or other moving vehicle. A navigation system on the vehicle provides position information to a microprocessor which functions with other circuitry to determine which map segment portions are to be combined to create the composite map segment.

7 Claims, 5 Drawing Figures

MOVING MAP DISPLAY

FIELD OF THE INVENTION

This invention relates to moving map displays.

BACKGROUND OF THE ART

It is often desirable to provide to the operator of a moving vehicle, typically an aircraft, a moving map display as a navigational aid, or to show the topographical and other features of the terrain over which he is or will be flying. This is particularly true for the pilot of an aircraft where the terrain may be obscured by cloud cover or darkness. Some advanced radar systems are capable of generating an image of the terrain immediately surrounding the aircraft. However, the terrain radar display contains only limited information and the radar image must be correlated with a navigational map in order to provide the pilot with useful information, such as labels identifying pertinent topographic features and landmarks. Moving map displays have been developed that utilize film strips that have been laboriously fabricated from many individual maps of smaller areas, which when combined form the total film strip. Presently, the means for storing maps to be displayed in moving map displays do not include video signal storage means.

SUMMARY OF THE INVENTION

The inability of the prior art to provide a moving map display using stored video signals is solved by my invention. In the present invention each map segment is stored as a video signal on video signal storage means. Position information from a navigation system is used to select the video signals for the map segments which are required to display the area, in the middle of which the vehicle is located. The video signals for the selected map segments are read out of video signal storage in parallel. A microprocessor controls video switching apparatus to select portions of the signals read out to be combined to make up a new composite map frame video signal used to display an area with the vehicle being located at the middle thereof. The new composite map frame signal is continuously changed or updated as the vehicle moves to keep the vehicle at the middle of the display.

The capacity of video signal storage means such as a commercial video disk is so large that a standard twelve inch disk can store fifty six thousand map segments. This permits a single video disk to store different map scales and overlay information for each map segment as desired by the equipment operator. Other video signal storage means such as magnetic drums, or other analog signal storage means may also be utilized. The invention will now be described with reference to the accompanying drawing where:

Figure 4:
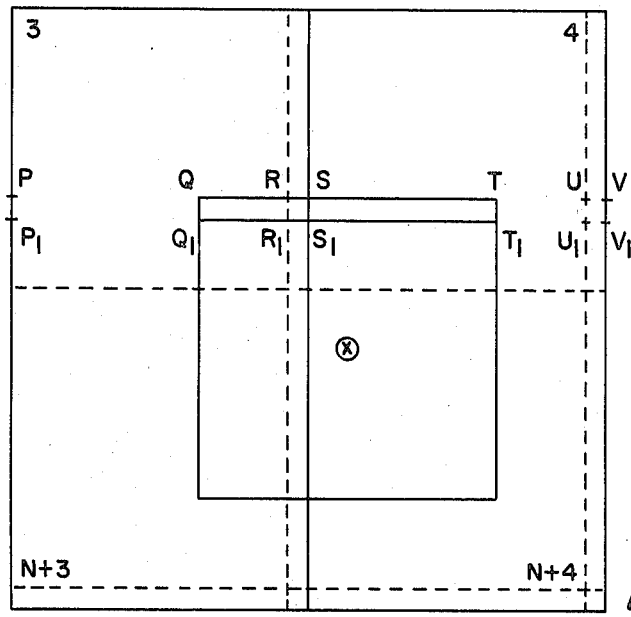
Figure 5:
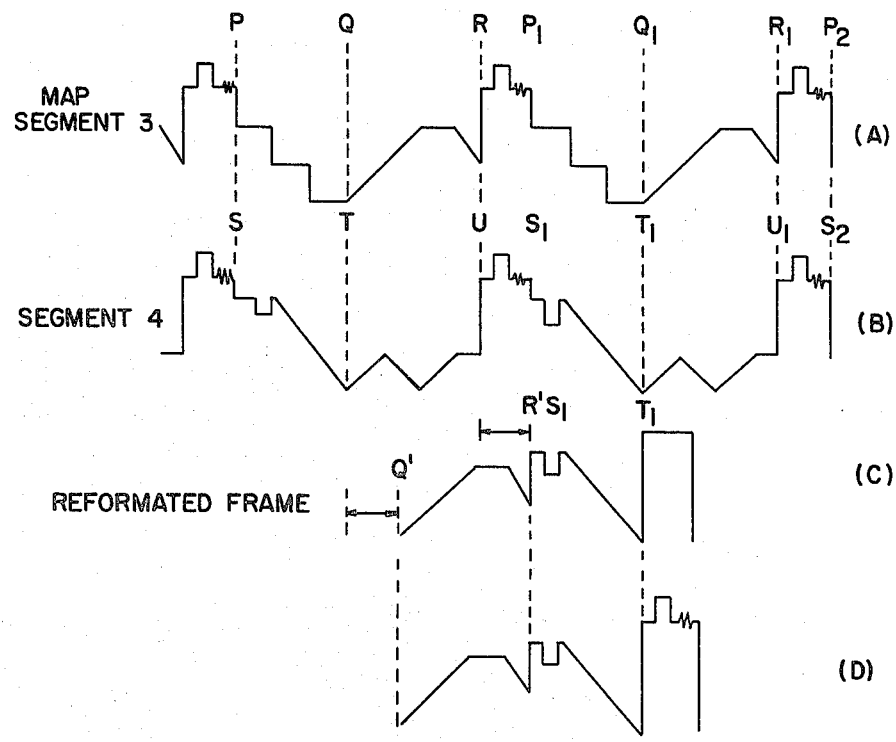

FIG. 4 is a more detailed representation of four adjacent map segments, video signals for which are stored on video signal storage means and portions thereof are combined to form the video signal for a new composite map segment; and FIG. 5 shows a representation of video signals stored on video signal storage means and how portions of them are combined to make up a composite video signal for a new map segment.

DETAILED DESCRIPTION

Figure 1:
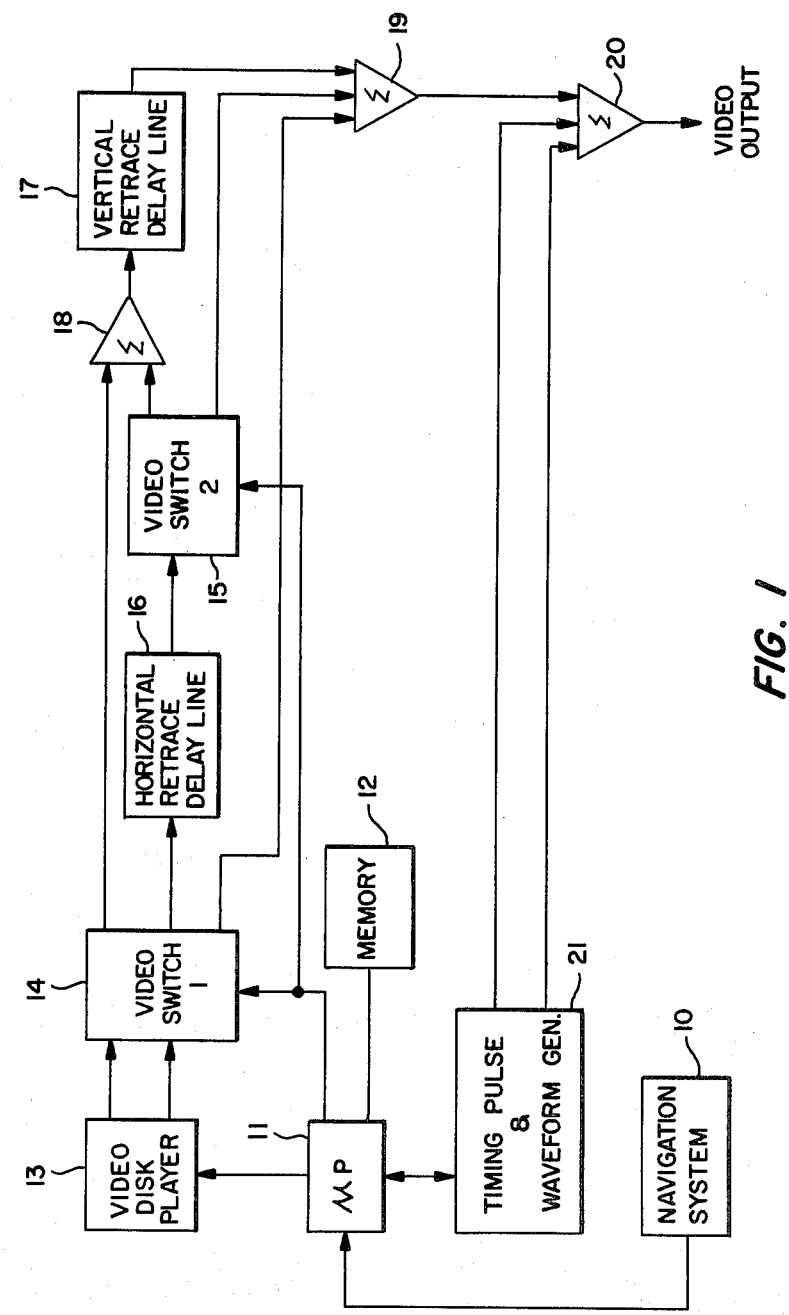
FIG. 1 is a system schematic block diagram of the present invention.

In FIG. 1 is shown the schematic block diagram for my invention. In the following description a video disk is used as the video signal storage means storing raster scan format video signals for the map segments. Navigation system 10 may be any one of the many navigation systems known in the art that provide output information regarding the present position of a vehicle or other craft on which navigation system 10 is located. In addition to the output information from navigation system 10 being displayed in some conventional well-known manner (not shown), the position information is also used as an input to a switching arrangement such as a microprocessor 11. Microprocessor 11 utilizes this information to look up in memory 12 the track that is to be accessed by video disk player 13 that has the video signal recorded thereon necessary to display a primary map segment for the area in which the vehicle containing navigation system 10 and my novel moving map display is located. In addition, microprocessor 11 utilizes information in memory 12 to locate other tracks on the video disk containing video signals for map segments adjacent to the primary map segment. The finer details regarding storage of video signals for map segments and the manner in which they are read out are described further in this specification.

Video disk player 13 may be made up of one, two, or four commercial video disk players operating in tandem or, preferrably, may be one video disk player with two playback heads. The reason for two playback heads in the preferred embodiment of video disk player 13 is to concurrently read out video signals stored on two different tracks of the video disk. These video signals are both applied to first video switch 14 which is under the control of microprocessor 11 which also controls the second video switch 15. Microprocessor 11 controls video switches 14 and 15 to selectively switch the video signal to delay circuits 16 and 17 and to summing circuits 18, 19 and 20 to make up a new video signal which has vertical and horizontal sync pulses added thereto. The sync pulses and other timing signals are provided by timing pulse and waveform generator 21 which operates synchronously with the video disk player using methods that are well known in the art.

Figure 2:
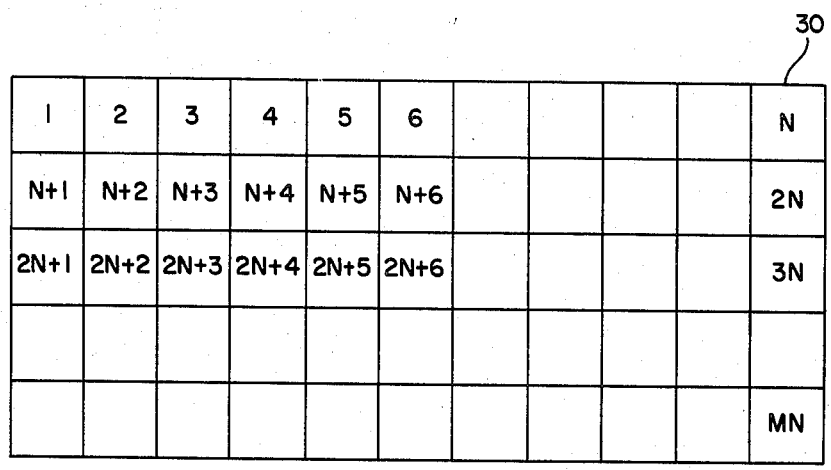
FIG. 2 represents a large map broken up into a number of map segments.

Turning now to FIG. 2, therein is shown a large map 30 broken up into a plurality of rows and columns of map segments. No typical map information is shown thereon to avoid cluttering up FIG. 2 and thereby detracting from an understanding of the present invention. As may be seen in FIG. 2, there are n columns by m rows of map segments making up a total of mn map segments. The designations on some of these map segments are self-explanatory.

Figure 3:
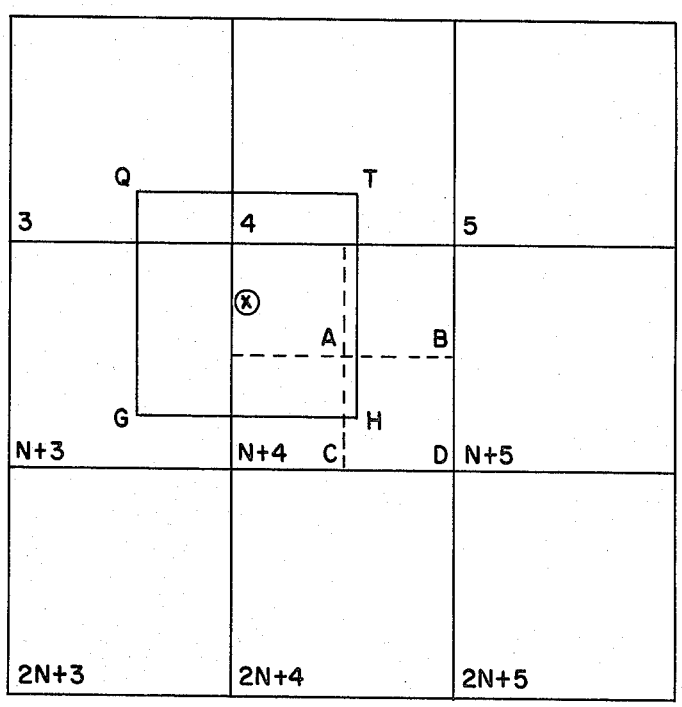
FIG. 3 is a blow-up of nine adjacent map segments from which a new map segment is to be made.

In FIG. 3 is shown a blow-up of nine of the map segments shown in FIG. 2. In operation, navigation system 10 provides information to microprocessor 11 indicating the position of the vehicle upon which navigation system 10 and my novel moving map display are located. By way of example, the vehicle position is represented by the (x) on map segment n+4 in FIG. 3. In order to show the position of the vehicle moving map display system does not just display map segment n+4. Rather, a new map portion represented by the bounds T, Q, G, and H is displayed. This requires that portions of map segments, 3, 4, n+3, and n+4 be selected and combined to make up the new composite map segment represented by the bounds T, Q, G, and H. This is accomplished by the teaching of my invention.

In viewing FIG. 3, it is obvious that the map segments chosen to make up a new composite map segment depend upon the position of the vehicle in the area shown by primary map segment n+4. In the example just given the vehicle is located within quadrant A of the map segment n+4 and, therefore, portions of map segments 3, 4, n+3, and n+4 are required to make up the new map segment. However, if the position of the vehicle were in quadrant B of map segment n+4, portions of map segment 4, 5, n+4, and n+5 would be required to make up the new map segment. In similar manner, if the position of the vehicle were located within quadrant C in map segment n+4 then portions of map segments n+3, n+4, 2n+3, and 2n+4 would be required to make up the new map segment. Likewise if the position of the vehicle were within quadrant D of map segment n+4 then portions of map segments n+4, n+5, 2n+4, and 2n+5 would be required to make up the new map segment in the center of which is displayed the position of the vehicle represented by (X). Thus, microprocessor 11 in the moving map display system must first determine the primary map segment n+4 covering the area in which the vehicle is located and then must determine which of the four quadrants thereof in which the vehicle is located. This is accomplished using look up tables stored in memory 12. The identity of the primary map segment and the appropriate quadrant thereof are used to address memory 12 and the information read out of the memory identifies the position of the four tracks on the disk.

With the example shown in FIG. 3, with the position of the vehicle being located in quadrant A of map segment n+4, the video signals for map segments 3, 4, n+3, and n+4 must be read out and the appropriate portions thereof selected and combined to make up the video signal for the composite map segment designated by the bounds T, Q, G, and H. In the preferred embodiment of the invention the two playback heads of video disk player 13 are initially positioned to concurrently read out the video signals for map segments 3 and 4 are completely read out. The two playback heads are then switched to the video disk tracks containing the video signals for map segments n+3 and n+4 and the video signals for these two map segments are read out during the next revolution of the video disk. The playback heads are then repositioned to again read the video disk tracks containing the video signals for map segments 3 and 4. This switching and reading process is repeated for the video disk tracks containing the video signals for map segments 3, 4, n+3, and n+4 until the vehicle upon which the moving map display equipment is located moves to another quadrant of map segment n+4 or another quadrant in one of map segments 3, 4, or n+3. At that time microprocessor 11 determines which new four map segments are to be read out and in what order to continue generating a video signal for the composite map segment showing the position of the vehicle at the center thereof. As the video disk player art advances it is apparent that the speed at which the read out head or other device means can switch from track to track will decrease. When the art has thus advanced, then only one read out head will be required that will be able to jump from one track to another track, and possibly across the whole disk, without sufficient delay to hinder the operation of my invention. It is also possible that new storage means will replace video disk players but will be able to function with my invention. However, with the present state of the art there are finite periods of time required to switch the read heads from one video disk track to another. To overcome this switching problem two read heads are presently utilized in the present preferred embodiment. No matter which four map segments are selected by microprocessor 11, as required to make up a new composite map segment, the four chosen map segments are recorded on four adjacent tracks on the video disk. The use of two read heads each of which only has to move from one track to an adjacent track minimizes track switching time delays that are detrimental to the operation of the present invention.

Utilizing the data compression techniques disclosed immediately hereinafter the number of times a given map segment must be recorded on a video disk is minimized. Other data compression techniques may also be utilized. For example, when the vehicle is located within quadrant A of map segment n+4, map segments 3, 4, n+3, and n+4 are read out in that order. It should be noted, however, that when the vehicle is located in quadrant C of map segment 4, the same four map segments are read out in the exact same order. When the vehicle is located in quadrant D of map segment 3, or in quadrant B of map segment n+3, again the same four map segments are read out in the same order. Thus, map segments 3, 4, n+3 and n+4 are recorded on four adjacent tracks of a video disk and when microprocessor 11 determines that the vehicle is in one of the aforementioned map segments and quadrants, the same group of four video disk tracks are read out.

Turning now to FIGS. 3 and 4, portions of the video signals of map segments 3, 4, n+3, and n+4 are selected to make up the new video signal for the composite map from QTHG. Referring also to FIG. 1, the new video signal for map frame QTHG is obtained by switching signals from the video disc player 13 with the first and second video switches 14 and 15. The new video signal for from QTHG is composed by switching the signals from the video disc player 13 so as to effect a transformation of coordinates from the coordinates of frames 3, 4, n+3, and n+4 to the coordinate of frame QTHG. Using simple mathematical relationships, and knowing the present position of the vehicle from the navigation equipment as represented by (X), one it can mathematically determine the corners T, Q, G, and H as shown in FIG. 3. As part of the above, it is also a simple mathematical calculation to determine on which scan lines and how far across particular scan lines the video signals being read off a track of the video disk must be selected or rejected to make up the new video signal for the composite map segment. For example, with references to FIG. 4, initially the two record heads are concurrently reading the two tracks on the video disk which contain the video signals for map segments 3 and 4. The video signals being read off tracks 3 and 4 represent a raster scanning beam starting at the upper left hand corners of the squares representing map segments 3 and 4 and sweep from left to right across the block and repeat this left to right sweep starting at the top of the block and progressing down to the bottom of the blocks in the conventional television raster format.

With the particular example represented in FIG. 4, a new composite video signal is to be made up for the new map segment having the (X) at its center and requiring portions of the video signals of map segments 3, 4, n+3, and n+4 to make up same. After the microprocessor 11 determines from the navigation system input that the vehicle upon which the moving map display equipment is located lies in quadrant A of map segment n+4, it uses this information to address memory 12 from which it reads the video disk track addresses for the video signals for map segments 3, 4, n+3, and n+4. Signals are then sent to video disk player 13 causing the read heads or other read mechanisms to initially position the two read heads on the tracks containing the video signals for map segments 3 and 4. As the video disk completes one full revolution the video signals required to completely display map segments 3 and 4 have been read off the disk in parallel and are forwarded to first video switch 14 so that portions thereof may be selected under the control of microprocessor 11. The read heads are then positioned to read the tracks containing the video signals for map segments n+3 and n+4 during the next revolution of the video disk. More particularly, as the video signals for map segments 3 and 4 are read off the disk in parallel they are initially blocked at first video switch 14 (see FIG. 1) as the signal figuratively sweeps from left to right and from top to bottom before the scan lines simultaneously sweeps starting at points P and S for these two map segments. However, as the video signals read off the video disk for map segments 3 and 4 come to the scan lines starting at points P and S on FIG. 4 portions of these signals are required to make up the new map segment. As the video signal is read off the disk for the remainder of map segment 3 from point P to point Q the signal read off the video disk is blocked at switch 14 but during the period between the points Q and R for each remaining sweep the signal read off the disk is passed through video switch 14. For the period of time between points R and S for each remaining sweep the signal for map segment 3 is blocked as it contains horizontal retrace signals which are not required. During this same period of time for the complete scan lines between points P and S the second head is reading the video signal for map segment 4 between points S and V. As switch 14 is disabled from passing through the portion of scan lines between points P and Q for map segment 3 it is enabled to pass through the video signal for map segment 4 between points S and T. Likewise, when disabled from passing video signal for map segment 3 between points Q and R it is disabled from passing signal between points T and U.

From a time flow of events, however, the signal that appears first at the output of switch 14 is that portion of the scan line of map segment 4 between points S and T and immediately thereafter that portion of the signal for the scan line of map segment 3 between points Q and R. The time order in which these signals appear is backwards and must be corrected for. These two signal segments are placed in the proper time sequence in the following manner. The video information for two adjacent raster scan lines, ST and S₁T₁ for example, is essentially identical. Video switch 14 is thus enabled to pass the video information to a first scan line between the points or time period represented by Q and R. Video switch 14 is then enabled to pass the video information for the segment S₁T₁ during the second or next scan line. In this manner, the video information for the period QR is placed before the video information for the period ST for a scan line of the new map segment. If the video information on S₁T₁ is significantly different enough to cause difficulty this can be accommodated by recording frames 4 and n+4 so that they are offset by one at the time the video disk is made.

One other problem now arises by operating in this manner. Although the video information for the period QR now occurs prior to the video information for the period ST within a single scan line of the new map segment the time period RS has not been taken into account. In a time flow of events the video signal for the period QR occurs first, then the period RS from which the horizontal blanking information has been blocked occurs, followed by the video information for the period ST. The period RS in the middle of the new frame or segment must be deleted in the manner described with reference to FIGS. 1 and 5.

In FIG. 5 at lines (A) and (B) are seen representative video signals for two horizontal scan lines read off two video disk tracks respectively designated map segment 3 and map segment 4. The same letter designations are used on FIG. 5 as used in FIG. 4 to represent portions of the video signal and the horizontal retrace signal. That is, the horizontal retrace signals with blanking pulse and other color burst information occur in the periods RS and UV. The time periods PQ, QR, ST, and TU are also shown. The video signal for the two scan lines of one track are shown identical but in reality this may not be so. As previously described, and with reference to line (A) of FIG. 5, video switch 14 is first disabled so as not to pass the video information occuring in time period PQ, but is at the same time enabled to pass the video signal occuring in the time period ST for map segment 4 in line (B). Thereafter, video switch 14 is enabled to pass the video signal in line (A) of FIG. 5 during the period QR but at the same time is disabled from passing the video signal during the period TU for map segment 4 in line (B). Video switch 14 switches the video signal for the period QR of map segment 3 through delay circuit 16, the delay of which is equal to the horizontal retrace time, RS, and thence through video switch 15 to summing circuit 18. Video switch 14 is controlled by microprocessor 11 to pass the video signal for the period ST of map segment 4 directly to the second input of summing circuit 18. The output from summing circuit 18 is the video wave form shown in line (C) of FIG. 5 and has the desired effect of removing the horizontal retrace period RS that would occur in the middle of the mixed video signal portions. The reformated video signal shown in line (C) which is the output from summing 18 is passed through delay circuit 17, the delay of which is equal to the vertical retrace time, to summing circuit 19, and then to summing circuit 20 to be mixed with new horizontal retrace information to make up the video output signal for the new map segment. Timing pulse and wave form generator 21 is the clock circuit for microprocessor 11 which in conjunction with timing track signals from video disk 13 helps microprocessor 11 determine when to operate video switches 14 and 15. In addition, microprocessor 11 causes pulses to be output from circuit 21 to the other two inputs of summing circuit 20 to add in horizontal retrace pulse and color burst information seen in FIG. 5 (D). The operation of the circuits in handling vertical retrace information is described hereinafter. As the read heads of video disk player 13 are reading the last raster scan line of both map segments 3 and 4 before vertical retrace signals, microprocessor 11 is aware of this due to the timing information it is receiving from circuit 21. Microprocessor 11 enables video switch 14 to pass the video signal for map segment 4 during the time period ST for the last scan line of map segment 4 but at this time disables video switch 14 from passing video signal for the subsequent period QR. Following the last reaster scan line of both map segments 3 and 4 the two read heads are reading out vertical blanking, vertical sync pulses and other control signals during the vertical retrace time as known in the art. Following the vertical retrace period microprocessor 11 is enabling and disabling switch 14 to pass through those portions of the video signals for map segments n+3 and n+4 in the manner just described for map segments 3 and 4 to finish making up the video signal for the new map segment. However, the vertical retrace period just mentioned will cause a band to appear across the map display. This band is deleted in a manner similar to that in which the horizontal retrace information was deleted. The reformated video signal for that portion of the new map segment made up of video signals from map segments 3 and 4 has been passing through delay line 17 to summing circuit 19 up to this time. At this point in time, microprocessor 11 operates video switch 15 to route the signals in a different fashion. That portion of the video signal coming from map segment n+3 is switched through delay circuit 16 to video switch 15 which then routes the signal directly to summing circuit 19 rather than to circuits 17 and 18 as done up to this point in time. Video switch 14 switches the portion of the video signal from map segment n+4 completely past circuits 15, 16, 17 and 18 to summing circuit 19. Thus, the signal output from summing circuit 19 is a video signal deleting the vertical and horizontal retrace pulses and other sync signals as originally read off the video disk. Summing circuit 20 then is used to add in sync signals such as horizontal and vertical sync and color burst information to the video signal to make up the complete composite video signal for the new map frame segment.

In an alternative embodiment of the invention, in each of the groups of four tracks/map segments previously described, the video signal for two of the four tracks is delayed on the disk by a time period equal to the horizontal retrace time. Referring to FIG. 4, the data stored for map segments 3 and n+3 is delayed by a period equal to the horizontal retrace period. The result is that the signal read by the first read head reading map segment 3 doesn't start reading the portion of video signal originally starting at the time represented by point Q, but rather starts reading that portion of video signal by an amount of time that is equal to the horizontal retrace time later or an interval represented between points R and S. The result is that the portion of video signal from the first read head that previously terminated at the point R now terminates at the point S, just as the signal from map segment 4 commences. This eliminates the need for horizontal retrace delay line 16, in order to make the signal portions contiguously sequential.

Another variation of this idea is not to shift the signal on the disk but to physically move or offset the first read head to accomplish the same delay. Similarly, at the appropriate moment in time both heads may be mechanically or electronically offset to effectively add or remove the vertical delay line 17 in FIG. 1.

Using the techniques described above map overlay information for each map segment may be stored on the video disk and portions thereof may be read off and combined with the video signal for the composite map segment. The composite map segment displayed would have the overlay information thereon.

With the large capacity of the video disk, map segments making up maps of different scales may be stored and in response to a scale indication from the operator of the moving map display the map segments of the indicated scale are selectively read out to make up the composite map segment displayed on the moving map display.

It would be obvious to one skilled in the art that other approaches may be used to reverse the time order of appearance of the video signal portions in the time periods QR and ST. For example, the video signal for the time period QR may be input to an analog shift register such as a charge coupled device (CCD) shift register and the microprocessor taps this shift register at an appropriate point to remove the signal therefrom so that it appears immediately following time period ST. The digital signal would then be reconverted to analog and be mixed with the other analog signal to make up the video signal for the new map segment.

While what has been described above is the preferred embodiment of the invention it would be obvious to those skilled in the art that many changes and modifications may be made thereto without departing from the spirit and scope of the invention. For example, as the video disk player art advances the read mechanisms therein may be able to switch between tracks fast enough to eliminate the present requirement for two or more playheads and thereby eliminate the need to organize map segments on adjacent tracks as previously described.

What is claimed is:

1. A moving map display showing features and other information regarding the area about a moving aircraft wherein a navigation system thereon indicates the position of the craft, wherein a mapped area is made up of a number of contiguous smaller area map segments with each map segment being stored as a video signal in a video storage means, and said map display has a composite map segment displayed that may be made up of portions of more than one stored map segment comprising:

switching means connected to said navigation system indicating the position of said craft for selecting, in response to information from the navigation system, ones of said stored map segments, portions of the video signals of which are required to make up said composite map segment to be displayed, and read means, under control of said switching means, for reading portions of the video signals for said selected map segments from the video storage means to make up said composite map signal.

2. A moving map display showing features and other information regarding the area about a moving craft wherein a navigation system thereon indicates the position of the craft, wherein a mapped area is made up of a number of contiguous smaller area map segments with each map segment being stored as a video signal in a video storage means, and said map display has a composite map segment displayed that may be made up of portions of more than one stored map segment comprising:

switching means connected to said navigation system indicating the position of said craft for selecting, in response to information from the navigation system, ones of said stored map segments, portions of the video signals of which are required to make up said composite map segment to be displayed, read means under control of said switching means for selecting portions of the video signals read from the video storage means, and means for combining said selected portions of the video signals to make up a new video signal used to display said composite map segment.

3. The invention in accordance with claims 1 or 2 further comprising:

memory means storing addresses for the small area map segments stored on the video storage means, appropriate ones of said addresses being read out of said memory means by said switching means responsive to indications from said navigation system indicating the position of the craft on which the navigation system is located, the addresses read out of said memory being used to read the video signals for the selected ones of said map segments from said video storage means.

4. The invention in accordance with claim 3 wherein said read means comprises:

a video switch under control of said switching means for selecting portions of the video signals read from the video storage means, delay circuit means to which said selected portions of the video signals may be applied to delay the signals, and summing means to which said delayed signals and signals from said video switch are applied to be summed together to make up said new video signal.

5. The invention in accordance with claim 4 wherein said moving map display utilizes a raster scan display and said delay circuit means comprises:

a first delay means having a delay equal to the horizontal retrace time of the raster scan display and used to remove horizontal retrace periods stored on said video storage means that are not needed in said new video signal, and a second delay means having a delay equal to the vertical retrace period of the raster scan display and used to remove vertical periods stored on said video storage means that are not needed in said new video signal.

6. The invention in accordance with claim 5 further comprising:

means for adding horizontal and vertical sync signals to said new video signal used for the display of said composite map displayed on said raster scan moving map display.

7. The invention in accordance with claims 1 or 2 wherein said selecting means comprises:

memory means storing addresses for the small area map segments stored on the video storage means, appropriate ones of said addresses being read out of said memory means by said switching means in response to indications from said navigation system indicating the position of the craft on which the navigation system is located, the addresses read out of said memory being used to read the video signals for the selected ones of said map segments from said video storage means.

* * * * *